United States Patent [19]
Imai et al.

[11] Patent Number: 5,799,145
[45] Date of Patent: Aug. 25, 1998

[54] DISK DRIVE APPARATUS HAVING SECURITY FUNCTION USING PASSWORD

[75] Inventors: Hiroshi Imai; Tasuku Kasebayashi, both of Tokyo, Japan

[73] Assignee: Kabushiki Kaisha Toshiba, Kawasaki, Japan

[21] Appl. No.: 691,551

[22] Filed: Aug. 2, 1996

[30] Foreign Application Priority Data

Dec. 25, 1995 [JP] Japan ................... 7336975

[51] Int. Cl.$^6$ ................................ G06F 12/16
[52] U.S. Cl. ...................... 395/188.01; 711/162
[58] Field of Search ................... 395/187.01, 188.01, 395/186, 182.04, 182.05, 489, 490, 491; 380/3, 4, 23; 711/162, 163, 164

[56] References Cited

U.S. PATENT DOCUMENTS

| | | | |
|---|---|---|---|
| 4,604,748 | 8/1986 | Sato | 371/38 |
| 4,943,964 | 7/1990 | Hatanaka et al. | 371/31 |
| 5,027,396 | 6/1991 | Platteter et al. | 380/4 |
| 5,189,566 | 2/1993 | Christensen et al. | 360/53 |
| 5,282,247 | 1/1994 | McLean et al. | 380/4 |
| 5,369,533 | 11/1994 | Ottesen et al. | 360/51 |
| 5,371,792 | 12/1994 | Asai et al. | 380/3 |
| 5,375,243 | 12/1994 | Parzych | 380/4 |
| 5,392,290 | 2/1995 | Brown et al. | 395/182.04 |
| 5,404,357 | 4/1995 | Ito et al. | 371/21.2 |
| 5,421,003 | 5/1995 | Escola et al. | 395/183.14 |
| 5,422,761 | 6/1995 | Anderson et al. | 360/47 |
| 5,544,083 | 8/1996 | Iizuka et al. | 364/709.01 |
| 5,596,639 | 1/1997 | Kikinis | 380/4 |

FOREIGN PATENT DOCUMENTS

| | | | |
|---|---|---|---|
| 61-26085 | 6/1986 | Japan | G06F 3/06 |
| 5-210497 | 8/1993 | Japan | G06F 9/06 |

*Primary Examiner*—Joseph Palys
*Attorney, Agent, or Firm*—Limbach & Limbach LLP

[57] ABSTRACT

Test data are written into all password data areas SDAs located on each of surfaces of a disk arranged in a disk drive apparatus. SDAs each having a low error rate are selected. A predetermined number of SDAs dispersed on the plural disk surfaces are selected as effective SDAs from the selected SDAs. Position data of these effective SDAs are registered in an EEPROM. A password is written into each of the effective SDAs in a low error rate order and the disk drive apparatus is set to a locked state. A password input by a user is compared with the password written into each of the effective SDAs to release the locked state. Therefore, when an unlock command is input, the password is read from each of the effective SDAs in the writing sequential order of the password. When the password is correctly read, the read password is compared with the password input by the user. The locked state is released only when these passwords coincide with each other.

10 Claims, 10 Drawing Sheets

SDA0 ~ SDA3 ------ SECURITY DATA AREA

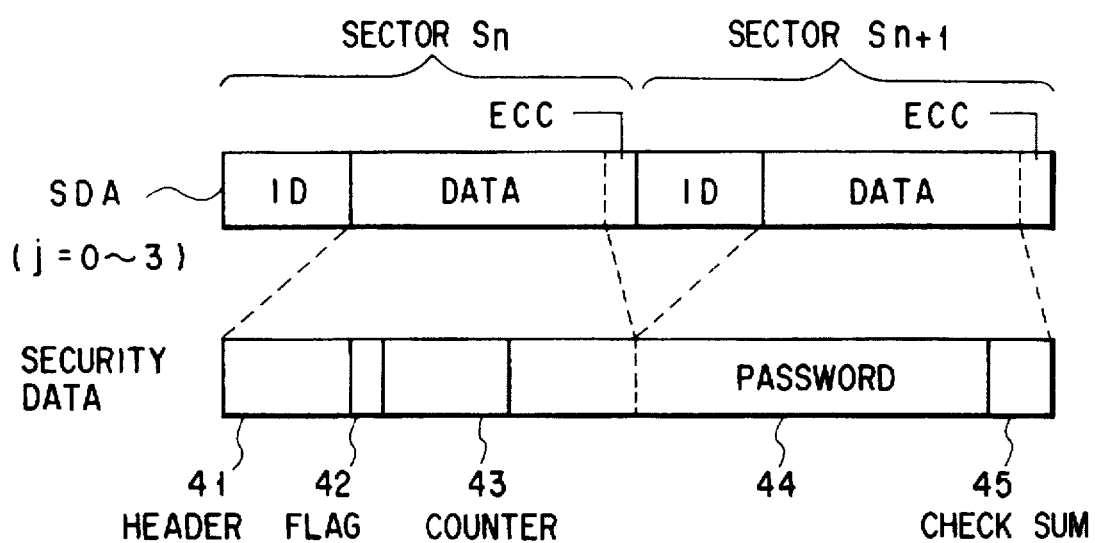
F I G. 3
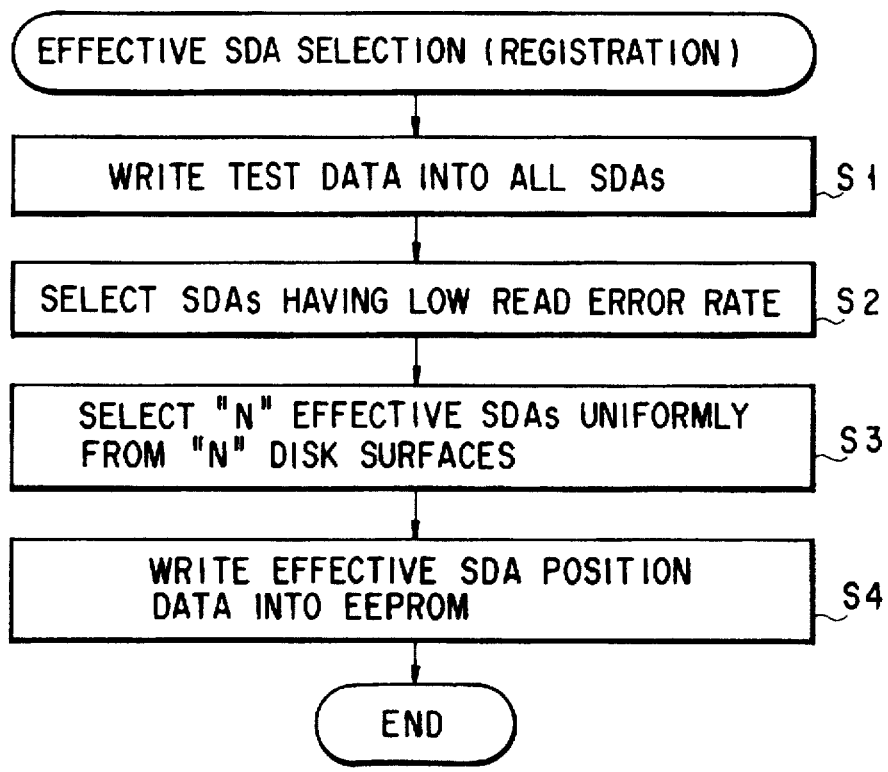
F I G. 4

5,799,145

1

DISK DRIVE APPARATUS HAVING SECURITY FUNCTION USING PASSWORD

BACKGROUND OF THE INVENTION

1. Field of the Invention

The present invention relates to a disk drive apparatus having a security function using a password.

2. Description of the Related Art

In recent years, a recording medium having a disk shape has often been used. This recording medium has a security function for preventing data recorded thereon from being illegally read by a third person and being altered by the third person. The security function can be provided by controlling an access right to the disk by verification of a password.

When a user wishes to protect the data recorded on the disk in the disk drive apparatus of this kind, the user performs an operation for setting the password from a host system to the disk drive apparatus. Thus, the password input by the user is transferred to the disk drive apparatus via a basic input/output system (BIOS) of the host system.

Here, two password setting systems in the disk drive apparatus are conventionally known. In a first password setting system, the password input by the user and transferred from the host system and a setting state of the security function (necessity or unnecessity of the verification of the password) are set and stored into a non-volatile memory such as an EEPROM (electrically erasable and programmable read-only memory) arranged in the disk drive apparatus. When these data are set and a hard reset (initialization based on a command from the host system) or a power-on reset (initialization upon turning-on of a power source) of the disk drive apparatus are then performed, this disk drive apparatus attains a locked state and a reading/writing operation on this disk drive apparatus (with respect to the disk) is inhibited unless the same password as the set password is input, thereby protecting the data recorded to the disk.

In the conventional disk drive apparatus using the above first password setting system, the password is set (stored) to the programmable or rewritable non-volatile memory typically constructed by the EEPROM. The rewritable non-volatile memory typically constructed by the EEPROM is normally mounted onto a printed circuit board. When the printed circuit board is exchanged, no locked state can be set so that non-security setting state (no password verification is required) is set. Accordingly, a problem exists in that the data on this disk drive apparatus can be freely accessed.

Therefore, a system for setting and storing security data in a specific area of the disk provided in the disk drive apparatus is considered as a second password setting system. In this case, it is possible to avoid a situation in which no locked state can be set as in the first system. However, this second system has a fatal defect. Namely, no fear of breaking the security data in the specific area of the disk by the following factors can be excluded.

(1) A defect is caused in a sector of an area in which the security data is written. Therefore, this sector becomes a grown defect.

(2) Power is interrupted during a writing operation of the security data.

(3) HDI (Head Disk Interference), i.e., head crash, in which a head collides with the disk, is caused. Therefore, all tracks or disk surfaces in this colliding position are broken.

When any one of the above (1) to (3) is caused in a specific area recording the security data thereto, the password is lost and no data can be completely accessed on the disk drive apparatus even when a correct password is input to the disk drive apparatus. Namely, in contrast to the first system, there is a fear that no locked state can be released.

SUMMARY OF THE INVENTION

Accordingly, it is an object of the present invention to provide a disk drive apparatus having a security function in which a password is stored into a specific area on a disk and password verification is required in getting access to the disk, and having a password backup function capable of coping with a situation in which the password stored in the specific area is broken due to a certain factor.

Another object of the present invention is to provide a disk drive apparatus having a password backup function capable of coping with a case in which no entire disk surface storing a password thereonto can be accessed by head crash, etc.

A further object of the present invention is to provide a disk drive apparatus of the above mentioned type in which the password can be efficiently accessed.

A still another object of the present invention is to provide a disk drive apparatus of the above mentioned type in which reliability of the stored password is improved.

According to the present invention, there is provided a disk drive apparatus capable of accessing to a disk when a set password is input to the disk drive apparatus comprising at least one disk in which plural password data areas are arranged on an entire disk and means for writing password data to the plural password data areas, whereby the password data areas have a backup function.

According to the present invention, there is provided another disk drive apparatus capable of accessing to a disk when a set password is input to the disk drive apparatus comprising at least one disk in which plural password data areas are arranged on at least two disk surfaces among all disk surfaces, and means for writing password data to the plural password data areas, whereby the password data areas have a backup function.

According to the present invention, there is provided a password management method in a disk drive apparatus having at least one disk and capable of accessing to the disk when a set password is input to the disk drive apparatus, the method comprising the following steps of arranging plural password data areas for storing password data entirely on at least one disk, and writing the password data in the plural password data areas, whereby the password data areas have a backup function.

According to the present invention, there is provided another password management method in a disk drive apparatus having at least one disk and capable of accessing to the disk when a set password is input to the disk drive apparatus, the method comprising the following steps of arranging plural password data areas for storing password data entirely on at least two disk surfaces among all disk surfaces, and writing the password data in the plural password data areas, whereby the password data areas have a backup function.

According to the present invention, there is provided an access control method of a disk drive apparatus for controlling access to a disk by verifying a password registered in the disk in advance with a password input by a user, the method comprising the following steps of writing password data to plural password data areas dispersed entirely on at least one disk, and reading the password from the plural password data areas and comparing the password normally read with the input password to control access based on a result of comparison.

The disk drive apparatus according to the present invention has a security function in which a password is stored into a specific area on a disk and password verification is required in getting access to the disk, and has a password backup function capable of coping with a situation in which the password stored in the specific area is broken due to a certain factor.

The disk drive apparatus according to the present invention has a password backup function capable of coping with a case in which no entire disk surface storing a password thereonto can be accessed by head crash, etc.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description input above and the detailed description of the preferred embodiments input below, serve to explain the principles of the present invention in which:

FIG. 3 is a view showing a sector format of each of the security data areas and a data format of security data set in the security data areas;

FIG. 4 is a flow chart showing an effective security data area selection in the first embodiment;

DETAILED DESCRIPTION OF THE PREFERRED EMBODIMENTS

A preferred embodiment of a disk drive apparatus according to the present invention will now be described with reference to the accompanying drawings.

|First embodiment|

Figure 1:
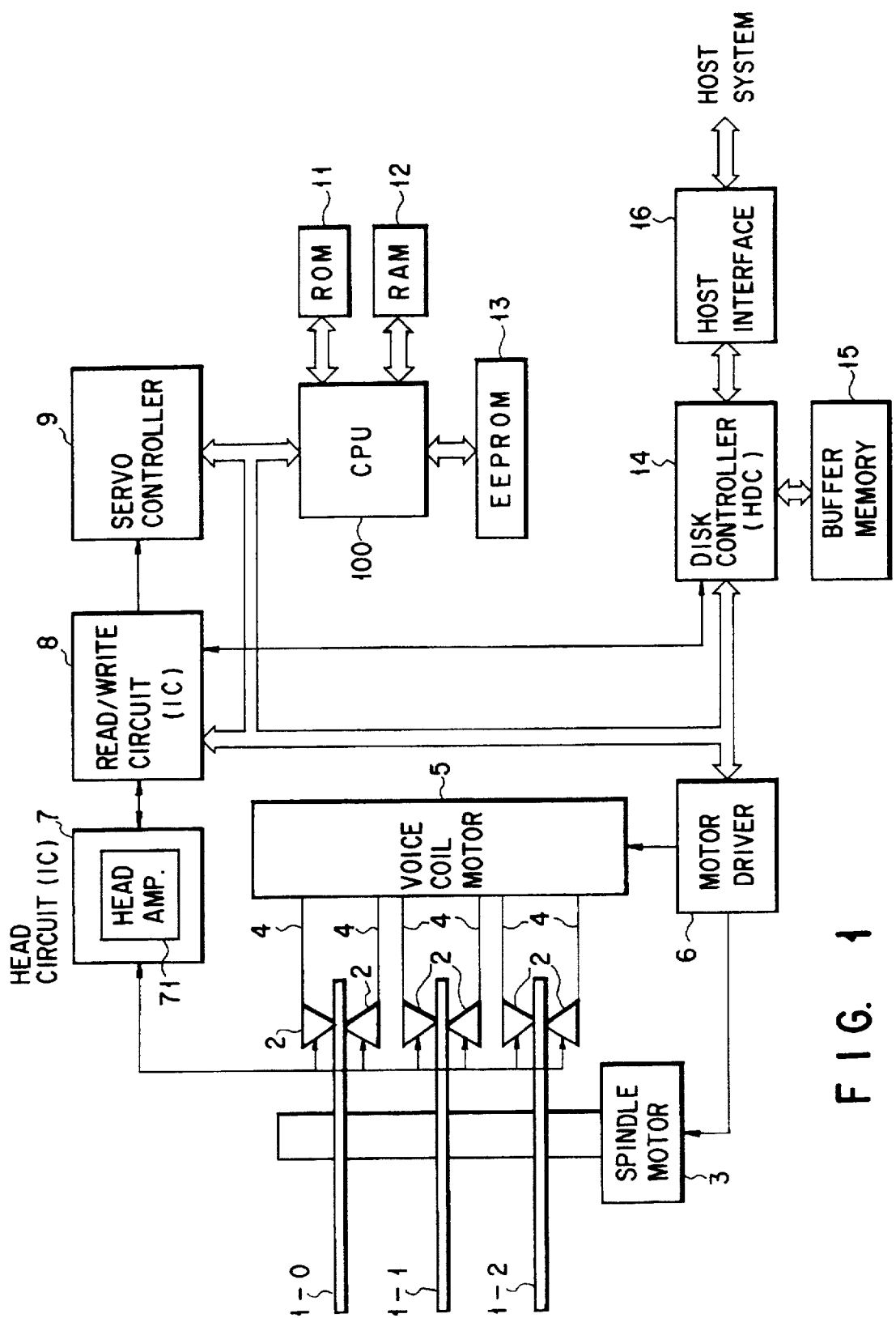
FIG. 1 is a block diagram showing the construction of a hard disk drive apparatus in accordance with a first embodiment of the present invention.

FIG. 1 is a block diagram showing the construction of a hard disk drive apparatus in accordance with a first embodiment of the present invention.

This disk drive apparatus has plural magnetic disks such as three disks 1-0, 1-1, and 1-2 as media onto which data are recorded. Six recording/reproducing heads (magnetic heads) 2 are arranged in accordance with respective surfaces (data surfaces) of these disks 1-0, 1-1, and 1-2. These recording/reproducing heads 2 are respectively used to write (or record) data onto these disk surfaces and read (or reproduce) the data from these disk surfaces.

Many tracks are formed in a concentric shape on both surfaces of the disk 1-i (i=0 to 2). Plural servo areas are arranged at an equal interval on each of the tracks. Servo data used in positioning control, etc. are recorded to the plural servo areas. (The servo data include cylinder data showing a cylinder number and burst data for showing a position error within a cylinder shown by the cylinder data by a waveform amplitude.) Namely, each of these servo areas is radially arranged across each of the tracks from a center of the disk 1-i. User areas are formed between the servo areas. One servo sector is constructed by one servo area and one user area subsequent to this servo area. Plural data sectors are included in the user area of each of the servo sectors.

The disk 1-i is rotated by a spindle motor (SPM) 3 at a high speed. The recording/reproducing head 2 is attached to a head moving mechanism called a carriage 4 and is moved in a radial direction of the disk 1-i by moving this carriage 4. The carriage 4 is driven by a voice coil motor (VCM) 5.

The SPM (spindle motor) 3 and the VCM (voice coil motor) 5 are connected to a motor driver 6. The motor driver 6 drives the spindle motor 3 by flowing a control current therethrough and also drives the voice coil motor 5 by flowing a control current therethrough. A value (control amount) of each of these control currents is determined by calculation processing of a CPU (microprocessor) 10. For example, this value is provided as a digital value.

Each recording/reproducing head 2 is connected to a head circuit (IC) 7 mounted to a flexible printed circuit board (FPC). The head circuit 7 switches the recording/reproducing heads 2 and performs inputting and outputting operations of a read/write signal between the recording/reproducing heads 2, etc. The head circuit 7 has a head amplifier 71 for amplifying an analog output read by each of the recording/reproducing heads 2.

The head circuit 7 is connected to a read/write circuit (IC) 8. The read/write circuit 8 generally has an encode/decode function for processing user data and a signal processing function for processing the servo data. The analog output (a reading signal of the recording/reproducing head 2) read from the disk 1-i by the recording/reproducing head 2 and amplified by the head amplifier 71 within the head circuit 7 is input to the read/write circuit 8.

The read/write circuit 8 performs signal processing required to reproduce data by using the decoding function. For example, in this signal processing, the analog output is converted to data in a non-return zero (NRZ) modulation system and is transferred to a disk controller 14. The read/write circuit 8 also performs a signal processing required to record data by using the encoding function. For example, in this signal processing, the NRZ data (write data) transmitted from the disk controller 14 are modulated and converted to data (for example, 2-7, 1-7 modulated data) written into the disk 1-i and are then transmitted to the head circuit 7.

The read/write circuit 8 also executes reproduction processing of the servo data required for servo processing such as head positioning control, etc. by using the signal processing function in addition to the above normal recording-reproducing processing of the user data. Namely, the read/write circuit 8 processes the servo data in the servo area read by the recording/reproducing head 2 and outputs a data pulse including the cylinder data to a servo processing circuit 9. The read/write circuit 8 also sample-holds a peak of the burst data in the servo data and outputs this peak to the servo processing circuit 9.

The servo processing circuit 9 receives the data pulse and the burst data from the read/write circuit 8 and executes a signal processing required for the servo processing. Namely, the servo processing circuit 9 has a decoding function for extracting and decoding the cylinder data (cylinder number), etc. from the data pulse from the read/write circuit 8 and also has a timing generating function of a write gate, etc . . . . The servo processing circuit 9 further has an A/D converting function for converting the burst data (analog signal) from the read/write circuit 8 into a digital signal and outputting this digital signal to the CPU 10.

For example, the CPU 10 is constructed by a microprocessor of one chip. This CPU 10 controls an operation of each portion within the magnetic disk drive apparatus in accordance with a control program stored to a ROM 11. Controls using the CPU 10 include a positioning control, a transfer control of read/write data using the disk controller 14, a password management control directly relating to the present invention, etc . . . . In the positioning control, the recording/reproducing head 2 is moved to an object position by driving and controlling the VCM 5 through the motor driver 6 in accordance with the cylinder data and the burst data in the servo data extracted by the servo processing circuit 9.

A ROM 11, a RAM 12, an EEPROM 13 and the disk controller 14 are connected to the CPU 10. The ROM 11 functions as a non-volatile memory into which a program (firmware) for controlling the operation of each portion within the magnetic disk drive apparatus is stored. The RAM 12 functions as a rewritable memory for providing a work area of the CPU 10, and a memory area of parameters, etc. used in the CPU 10. The EEPROM 13 functions as a rewritable non-volatile memory into which parameters for control of the magnetic disk drive apparatus are stored.

The disk controller 14 controls commands and communication of data between this disk controller 14 and a host system (not shown). Further, the disk controller 14 controls communication of data between this disk controller 14 and the disk 1-i through the read/write circuit 8. A buffer memory 15 and a host interface 16 are connected to this disk controller 14. For example, the buffer memory 15 is constructed by a RAM, etc. and read/write data are stored into this buffer memory 15 in a cache system. The host interface 16 constitutes an interface between the disk controller 14 and the host system. The disk controller 14 gives commands and communicates data between this disk controller 14 and the host system through the host interface 16.

Figure 2:
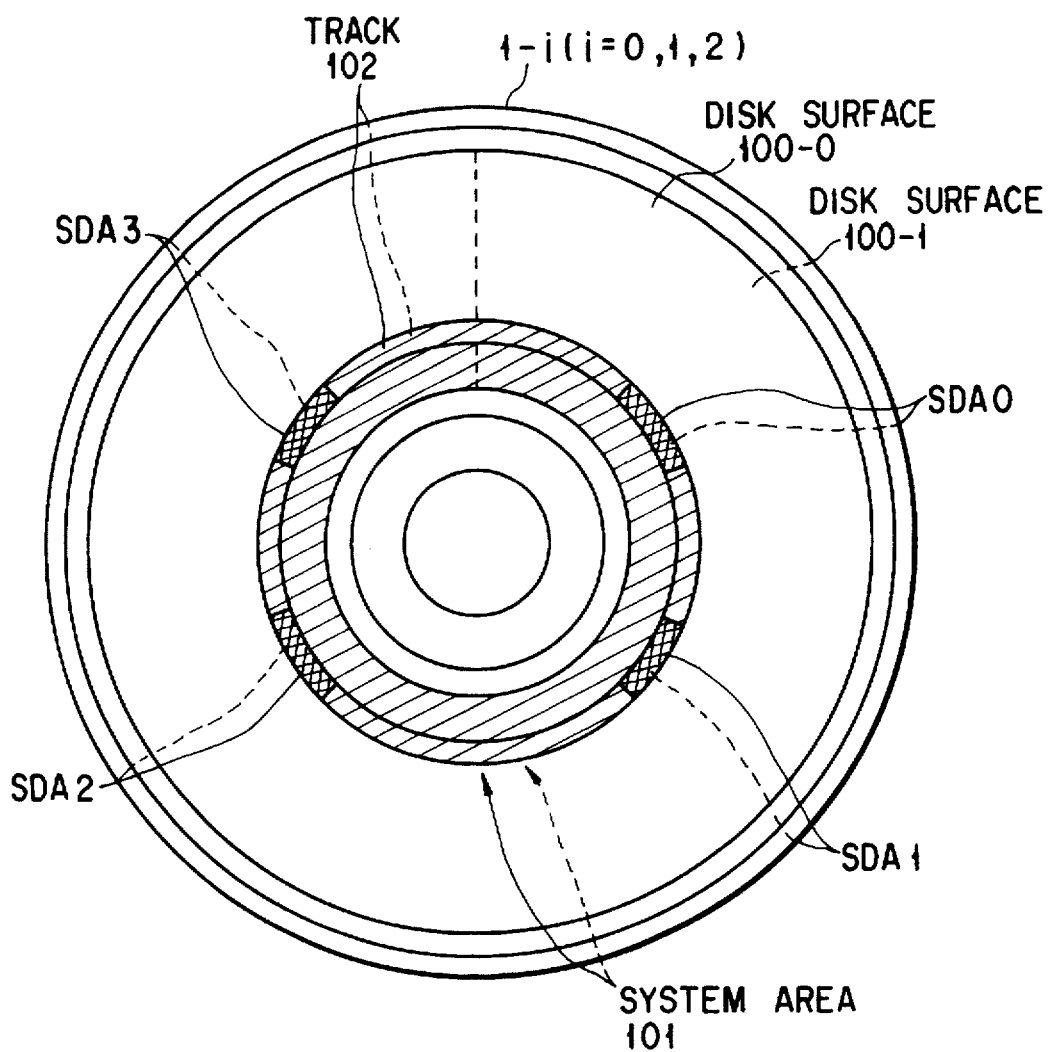
FIG. 2 is a view showing that plural security data areas are on a surface of each of disks shown in FIG. 1.

FIG. 2 shows the format of a surface of each disk 1-i shown in FIG. 1. In FIG. 2, both surfaces of one disk 1-0 are shown on the same surface. Each of the other disks 1-1 and 1-2 is similar to the disk 1-0. A system area 101 is allocated in a predetermined area of both disk surfaces 100-0 and 100-1, e.g., on predetermined plural continuous tracks on an inner circumferential side. This system area 101 is set in an area different from a data area (an area on an outer circumferential side of the system area in FIG. 2) and is used to store defect data, etc. on a corresponding disk surface.

For example, four security data areas (Security Data Areas) SDA0 to SDA3 used to store security data (password) are on one predetermined track 102 in the system area 101. Here, the security data areas SDA0 to SDA3 are dispersed at random on the track 102. For convenience of design, the security data areas SDA0 to SDA3 are set to be located in the same position on both of the disk surfaces 100-0 and 100-1 of each disk 1-i. However, it is not necessary to locate these security data areas in the same position on both of the disk surfaces 100-0 and 100-1. Further, it is not necessary to locate the track 102 having the SDA0 to SDA3 in the same position on both the disk surfaces 100-0 and 100-1 of each disk 1-i. Head numbers of the disk surfaces 100-0 and 100-1 of the disk 1-0 are respectively set to "0" and "1" (namely, heads #0 and #1). Head numbers of the disk surfaces 100-0 and 100-1 of the disk 1-1 are respectively set to "2" and "3" (namely, heads #2 and #3). Head numbers of the disk surfaces 100-0 and 100-1 of the disk 1-2 are respectively set to "4" and "5" (namely, heads #4 and #5).

For example, as shown in FIG. 3, each security data area SDAj (j=0 to 3) is constructed by two continuous sectors (data sectors) Sn and Sn+1. Each of these sectors Sn and Sn+1 is constructed by an ID portion, a data portion, and an ECC portion for an error detecting correction. A password is uniformly stored into both data portions of the sectors Sn and Sn+1. This security data is constructed by a header portion 41 showing the security data, a flag 42 showing whether or not a password is set, a counter portion 43 (an initial value 1) showing a version of the password (the number of password writing), the password 44, and a check sum 45 for detecting an error in the password over the sectors Sn and Sn+1.

An operation of the disk drive apparatus in this embodiment will next be described. Here, management/control of the password will mainly described.

Effective SDA selecting-registering processing according to the flow chart of FIG. 4 is performed when the magnetic disk drive apparatus of FIG. 1 is manufactured. This effective SDA selecting-registering processing is started by transmitting a starting command of this effective SDA selecting-registering processing to the magnetic disk drive apparatus of FIG. 1 from the host system connected to the host interface 16 of this magnetic disk drive apparatus.

The starting command of the effective SDA selecting-registering processing from the host system is transmitted to the CPU 10 through the host interface 16 and the disk controller 14. When the CPU 10 receives the starting command of the effective SDA selecting-registering processing from the host system, the CPU 10 writes test data (test data for detecting a defect) for checking a predetermined read error to all the security data areas SDA0 to SDA3 respectively allocated within the system area 101 on each of the disk surfaces 100-0 and 100-1 of the three disks 1-0 to 1-2 in disk write processing in a step S1. Namely, in this disk write processing, the CPU 10 writes these test data to 24 security data areas SDAs in total.

In a step S2, the CPU 10 reads the test data written into the security data areas SDA0 to SDA3 on each of the disk surfaces 100-0 and 100-1 of the above disks 1-0 to 1-2 (in disk read processing), and selects security data areas SDAs each having a low error rate.

In a method for selecting the security data areas SDAs each having a low error rate, an operation of ECC correction is stopped and a reading operation of data is performed for each SDA plural times (a predetermined number of times), and the SDAs each having a low error rate are selected from SDAs having a large number of readable times. Otherwise, in another method for selecting the security data areas SDAs each having a low error rate, the number of read retry times is set and security data areas SDAs readable at a retry number equal to or smaller than a set retry number are selected.

Here, nine areas in total composed of three areas (SDA1, SDA2, SDA3) from the disk surface 100-0 (head #0) of the disk 1-0, one area (SDA2) from the disk surface 100-1 (head #1) of the disk 1-0, two areas (SDA1, SDA3) from the disk surface 100-0 (head #2) of the disk 1-1, two areas (SDA0, SDA2) from the disk surface 100-0 (head #4) of the disk 1-2, and one area (SDA1) from the disk surface 100-1 (head #5) of the disk 1-2 are set to be selected (detected) as the security data areas SDAs each having a low error rate.

Thus, the CPU 10 selects the nine security data areas SDAs each having a low error rate from the 24 security data areas SDAs in the step S2. Thereafter, in a step S3, the CPU 10 selects N predetermined SDAs (N is an integer equal to or greater than 2, here, N=4) and dispersed on plural (here, N) disk surfaces as effective SDAs from these nine security data areas.

Accordingly, in this embodiment in which the above nine security data areas SDAs are selected in the step S2, for example, one area SDA1 (SDA2, or SDA3 may be also set) having a lowest error rate is selected from SDA1, SDA2, and SDA3 selected in the step S2 on the disk surface 100-0 (head #0) of the disk 1-0. One area SDA2 is selected from another disk surface 100-1 (head #1) of this disk 1-1. One area SDA1 (SDA3 may be also set) having a lowest error rate is selected from SDA1 and SDA3 selected in the step S2 on the disk surface 100-0 (head #2) of the next disk 1-1. No area SDA having a low error rate exists on the disk surface 100-1 (head #3) of this disk 1-1. Therefore, one area SDA0 (SDA2 may be also set) having a lowest error rate is selected from SDA0 and SDA2 selected in the step S2 on the disk surface 100-0 (head #4) of the next disk 1-2.

In this embodiment, when the number of effective SDAs selected in the step S2 is less than N (=4), or when the number of effective SDAs is equal to or greater than N, but these effective SDAs are not dispersed on plural (here, N or more) disk surfaces, the corresponding magnetic disk drive apparatus is treated as inferior goods so that no subsequent processing is performed.

The CPU 10 selects the N effective security data areas SDAs in the step S3. Thereafter, in a step S4, position data of these N effective SDAs are registered in a predetermined area of the EEPROM 13 and the effective SDA selecting-registering processing is terminated.

Figure 5:
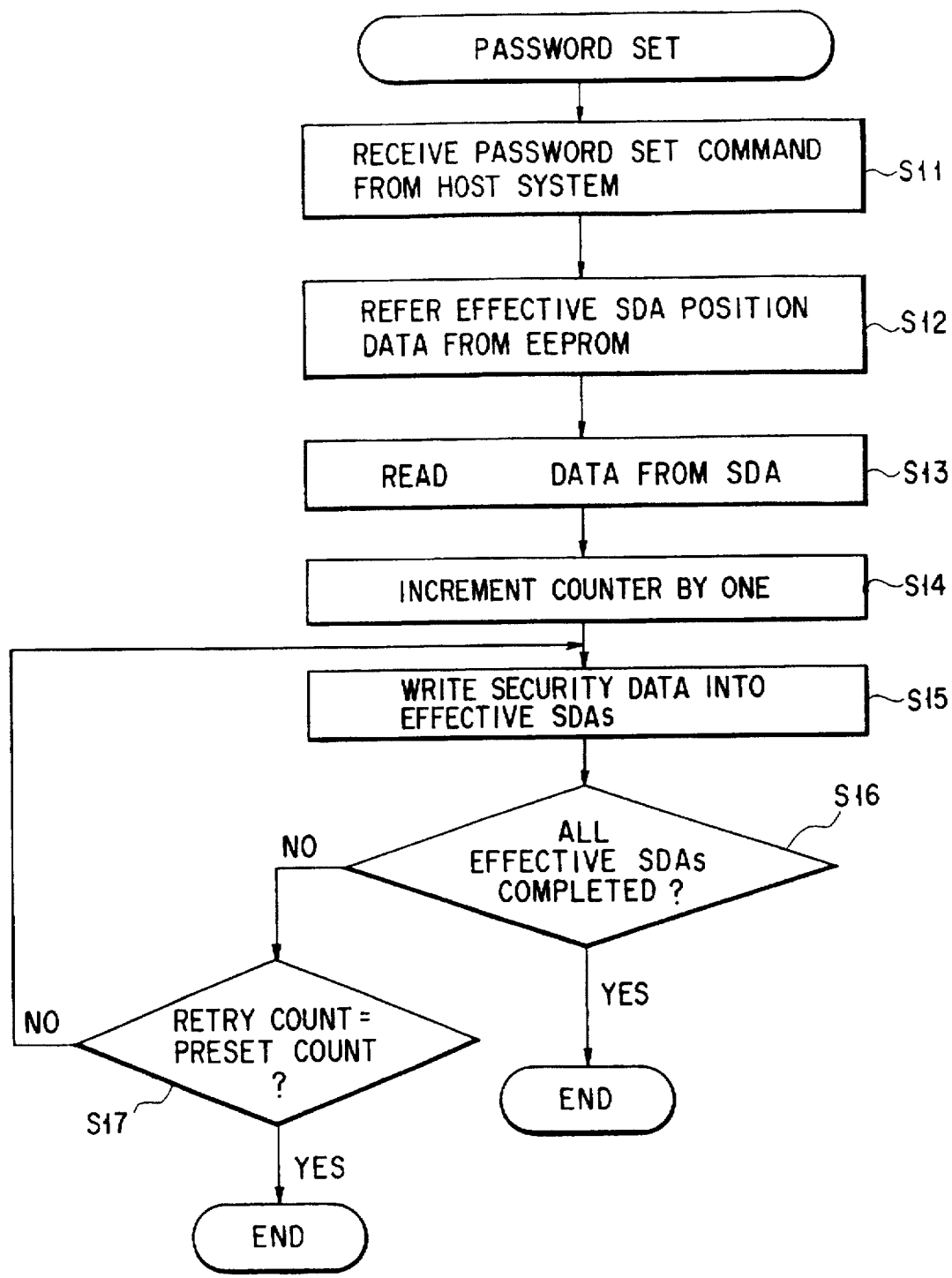
FIG. 5 is a flow chart showing a password setting processing in the first embodiment.

The next explanation relates to a processing (lock, or password setting processing) performed in locking the magnetic disk drive apparatus by the operation of a user with reference to FIG. 5 after the magnetic disk drive apparatus having the EEPROM 13 registering the N effective SDA position data thereto in this way is sold. It is assumed that value "1" is initially set to the counter portion 43 (see FIG. 3) of each of the N effective SDAs selected in the effective SDA selecting-registering processing during a time until the shipment after this effective SDA selecting-registering processing. However, this initial setting processing is not required if the counter portion 43 having value 1 is arranged in test data written into the SDAs in the above step S1.

First, a desirable password is set in the magnetic disk drive apparatus of FIG. 1 and an operation for locking this disk drive apparatus is performed by the host system. Thus, a password set command including the password input by the user is transmitted from the host system to the magnetic disk drive apparatus of FIG. 1.

In a step S11, the CPU 10 receives the password set command transmitted from the host system through the host interface 16 and the disk controller 14.

In a step S12, the CPU 10 refers to the effective SDA position data registered in the predetermined area of the EEPROM 13.

In a step S13, the CPU 10 reads data from one of N effective security data areas SDAs in total dispersed on N disk surfaces (here, N=4) among the respective disk surfaces 100-0 and 100-1 (namely, the six disk surfaces in total) of the disks 1-0 to 1-2 (in disk read processing).

In a step S14, the CPU 10 increments contents of the counter portion 43 (FIG. 3) by one.

In a step S15, the incremented value ("2" in the first password setting processing) is written into the counter portion 43 and the password input by the user is written into the password portion 44 of the SDA read in step S13. The flag 42 is set to indicate the password setting (disk write processing).

The check sum 45 is added to this security data including the flag portion 42, counter portion 43, and password portion 44. When the security data is dividedly written into two sectors Sn and Sn+1 constituting the effective SDA, for example, there is a case in which power is interrupted after a part of the security data is written into the first sector Sn so that the remaining security data is not written into the second sector Sn+1. In this case, mismatching of the check sum can be detected at a subsequent reading time even when there is no ECC error. Accordingly, an error in this effective SDA can be detected.

The CPU 10 repeatedly executes the above step S15 with respect to the N effective SDAs and terminates the password setting processing (steps S16 and S17). Thereafter, when a hard reset or a power-on reset of the magnetic disk drive apparatus is performed, this magnetic disk drive apparatus is set to a lock state. Unless the same password as the set password is input from a user and the lock state is released, a reading/writing operation (with respect to the disks 1-0 to 1-2) on this magnetic disk drive apparatus is inhibited so that data recorded to the disks 1-0 to 1-2 are protected.

Next, an unlock processing will be described with reference to the flow chart of FIG. 6.

When the user utilizes the magnetic disk drive apparatus set to the locked state in this way, an operation for releasing the locked state of this magnetic disk drive apparatus is performed from the host system side. Thus, a command (an unlock command) for unlock including the password input by the user is transmitted from the host system to the magnetic disk drive apparatus of FIG. 1.

In a step S21, the CPU 10 receives the unlock command transmitted from the host system through the host interface 16 and the disk controller 14.

In a step S22, the CPU 10 refers to the effective SDA position data registered in the predetermined area of the EEPROM 13.

In a step S23, the CPU 10 reads set data (security data) from one of N effective security data areas SDAs in total dispersed on N disk surfaces (here, N=4) among the respective disk surfaces 100-0 and 100-1 (namely, the six disk surfaces in total) of the disks 1-0 to 1-2 (in disk read processing). This disk read processing is performed by performing the operation of ECC correction.

Every time the CPU 10 reads security data from one effective SDA, the CPU 10 checks in a step S24 whether or not the reading operation is successfully performed and a value of the read security data matches with the check sum 45 added to this security data. In a step S25, the CPU 10 temporarily holds this security data only when the value of the read security data matches with the check sum 45 (at a matching time of the check sum).

The CPU 10 repeatedly executes the above steps S22 to S25 with respect to the N effective SDAs (step S26). In a step S27, the CPU 10 selects one of security data providing a largest counting value of the counter portion 43 among all security data stored at that time point with this one security data as a newest security data in which the password is correctly set.

In a step S28, the CPU 10 compares the password 44 in the selected security data with the password designated or input by the user. (This input password is a password added to the unlock command transmitted from the host system.) When these passwords coincide with each other in a step S29, the locked state is released in a step S30.

Here, the security data mismatching with the check sum is excluded from an object of the security data selection processing in the step S27 for the following reasons even when this security data is correctly read.

When the security data is dividedly written into two sectors Sn and Sn+1 constituting an effective SDA and power is interrupted after the security data is written into the sector Sn, the former half portion of newest security data is written into a data portion of the first sector Sn. However, the latter half of the previous security data is left as it is in a data portion of the second sector Sn+1. In this case, read security data can not be regarded as being correct simply because there is no error in the data read from the sectors Sn and Sn+1. Therefore, in this embodiment, the check sum 45 is added to the security data. When there is no read error in the security data, but the read security data mismatches with the check sum, this security data has an influence on power interruption (or a failure of lock processing) at a writing time. Accordingly, the former half portion and the latter half portion of this security data are not written in the same period or are not of the same version so that this security data is excluded from an object of the security data selection processing in the step S27 as mentioned above.

One of security data providing a largest counting value of the counter portion 43 in the processing in the above step S27 is selected as an object of the password verification for the following reasons.

When power is interrupted after a new security data is written into a certain effective SDA among N effective SDAs, the previous security data is left as it is in the remaining SDAs. In this case, read security data can not be regarded as being correct (newest) simply because there is no error in the data read from the sectors Sn and Sn+1 and there is no mismatching of the check sum. Therefore, in this embodiment, the security data includes the counter portion 43 and contents of this counter portion 43 is incremented by one in newly setting the security data so that a newest version of this security data is shown. Accordingly, security data providing a largest counting value of the counter portion 43 among the respective security data having no read error and no mismatching of the check sum is selected as a newest security data which is an object of an unlocking judgment. Thus, correct comparing processing with the password input by a user is guaranteed even when power is interrupted and the lock processing fails midway at a writing time of the security data.

As described above, in accordance with this embodiment, a disk drive apparatus has a security function for allowing disk access only when a password coinciding with a set password is input from a host system. Plural areas for setting security data including the passwords are arranged on entire disks included in this disk drive apparatus. The security data is written into the plural security data areas.

Thus, the security data is stored in the plural security data areas. Namely, plural passwords compared with the password input from the host system can be stored in a state in which the plural passwords include their backups. Therefore, even when data in a certain security data area is lost by accidents of a subsequent defect, power interruption, etc., it is possible to obtain a password necessary to be compared with the password input from the host system through another security data area.

Further, in this embodiment, plural (m) areas for setting the security data are uniformly arranged on at least two disk surfaces, i.e., plural disk surfaces among surfaces of all disks. The security data is written into the plural (m or less) security data areas uniformly arranged on these plural disk surfaces. Thus, the security data areas are uniformly arranged on the plural disk surfaces. Therefore, even when head crash, etc. are caused and a certain entire disk surface cannot be accessed, it is possible to obtain a password necessary to be compared with a password input from the host system through a security data area arranged on another disk surface. Accordingly, reliability of backup can be further improved.

Further, in this embodiment, in addition to the above construction, a predetermined number of areas each having a low rate of a read error are selected as effective security data areas from all security data areas such that these selected areas are dispersed on at least two disk surfaces (plural disk surfaces). Position data of the predetermined number of selected effective security data areas are registered in a non-volatile memory. When the security data is accessed, this accessed place is determined on the basis of the position data registered in the non-volatile memory. Therefore, a predetermined number of areas each having a low rate of a read error are selected from the plural (m) security data areas prepared in advance. These selected areas are set to effective security data areas and are used to get access to the security data.

Accordingly, it is possible to avoid generation of retry processing, etc. at a reading time of the security data areas so that the security data can be accessed by minimized processing.

In order to select security data areas each having a low rate of a read error, test data or the security data can be written into all the security data areas and the respective areas can be then read plural times so that a predetermined number of areas having a large number of readable times are selected in a large number order. However, in a disk drive apparatus having an ECC correction function with respect to read sector data (such a disk drive apparatus is general), it is more effective to stop the ECC correction function and perform the above reading operation. Further, a reference value of the number of readable times may be set and the disk drive apparatus may be regarded in error when the number of areas having a value equal to or greater than this reference value does not exceed a predetermined number.

In another method for selecting security data areas each having a low rate of a read error, test data or the security data can be written into all the security data areas and the respective areas can be then read. In this method, a predetermined number of areas having the number of retry times equal to or smaller than a certain constant value among the areas normally read are selected in a small order of the number of retry times.

Further, in this embodiment, a counter portion for counting the number of security data setting times is formed in security data set in a security data area. When the security data is written into the security data area, this area is read and a counting value of the counter portion set in this area is incremented by a predetermined number. The security data having this incremented value in the counter portion is written into this area so that version of the security data is managed. Security data having a largest counting value of the counter portion among the security data in the normally accessed security data areas is used to compare with the password input from the host system.

Therefore, even when power interruption, etc. are caused at any time point of processing for setting the security data in the plural security data areas, counting values of the counter portion in the respective security data are compared with each other so that it is possible to detect a security data area in which a newest security data can be set before the power interruption. Accordingly, maintenance of the security data is improved.

Another embodiments of the present invention will next be described. In the following embodiments, portions corresponding to those in the first embodiment are designated by the same reference numerals and a detailed explanation thereof is omitted.

[Second embodiment]

In the first embodiment, the counter portion 43 is formed in security data such that the password 44 in the security data influenced by power interruption, etc. at a writing time of the security data is not an object of password verification. However, this counter portion 43 is not necessarily required. In the second embodiment, no counter portion 43 in the security data is required as described in the following explanation. Hardware is the same as FIGS. 1 and 2, and an SDA format is obtained by omitting the counter portion 43 from FIG. 3.

Figure 6:
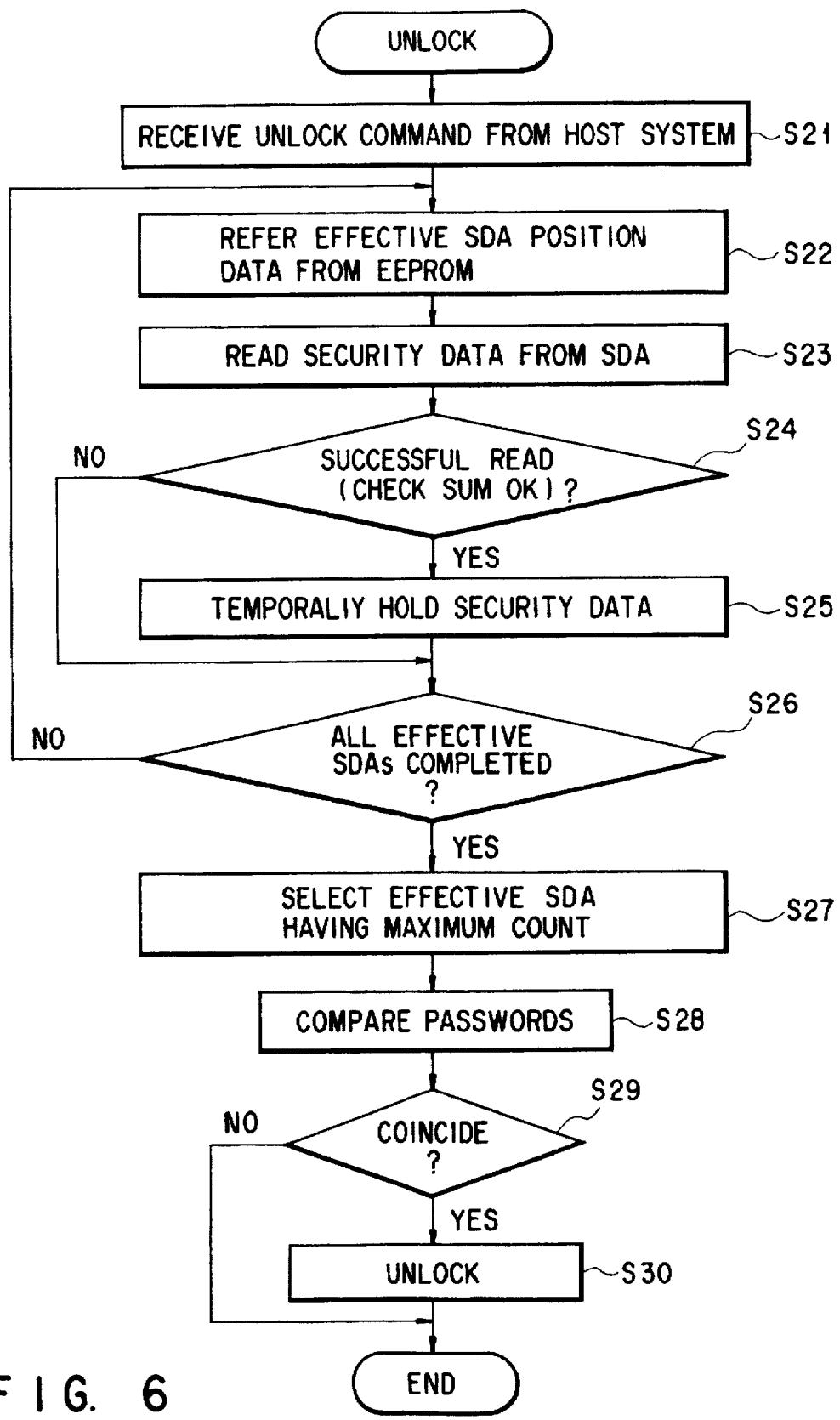
FIG. 6 is a flow chart showing an unlock processing in the first embodiment.
Figure 7:
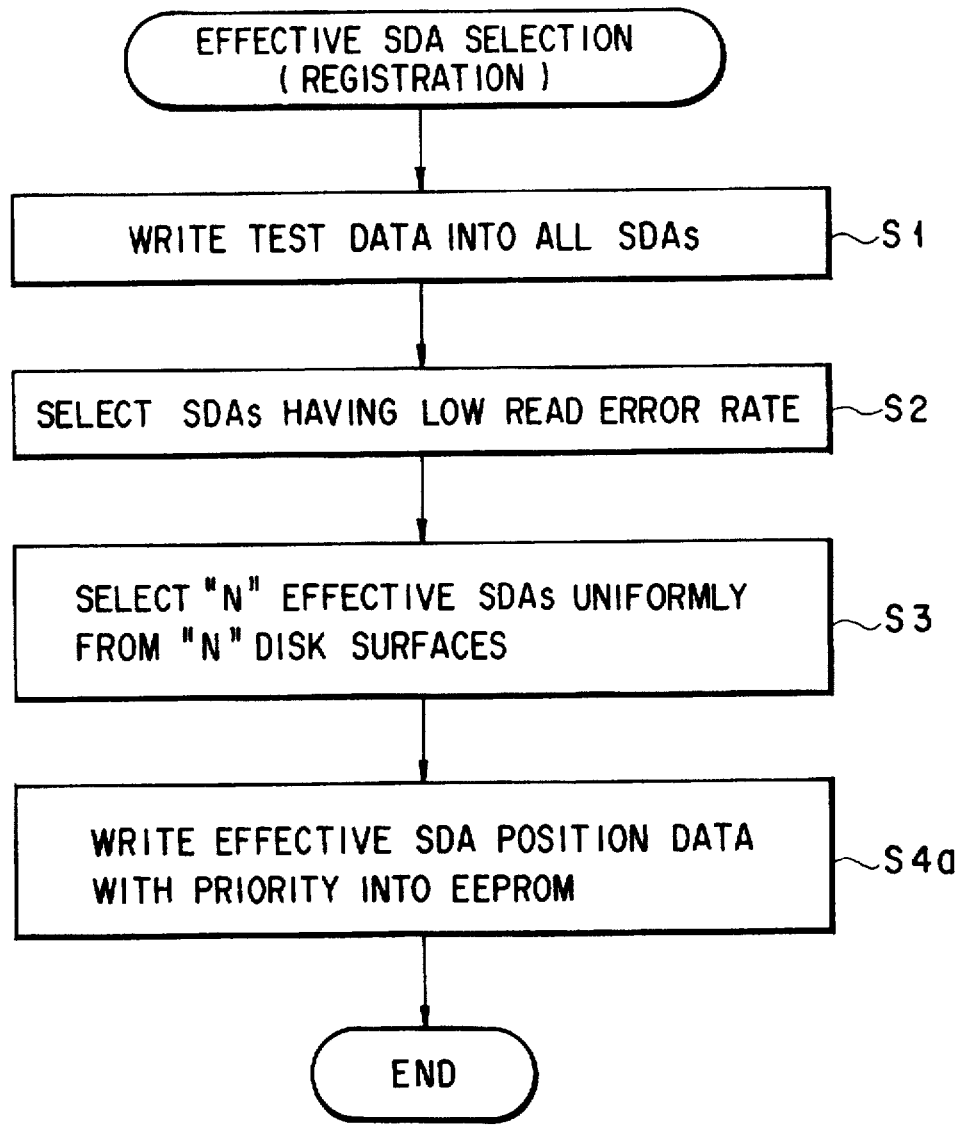
FIG. 7 is a flow chart showing an effective security data area selection in a second embodiment of the present invention.
Figure 8:
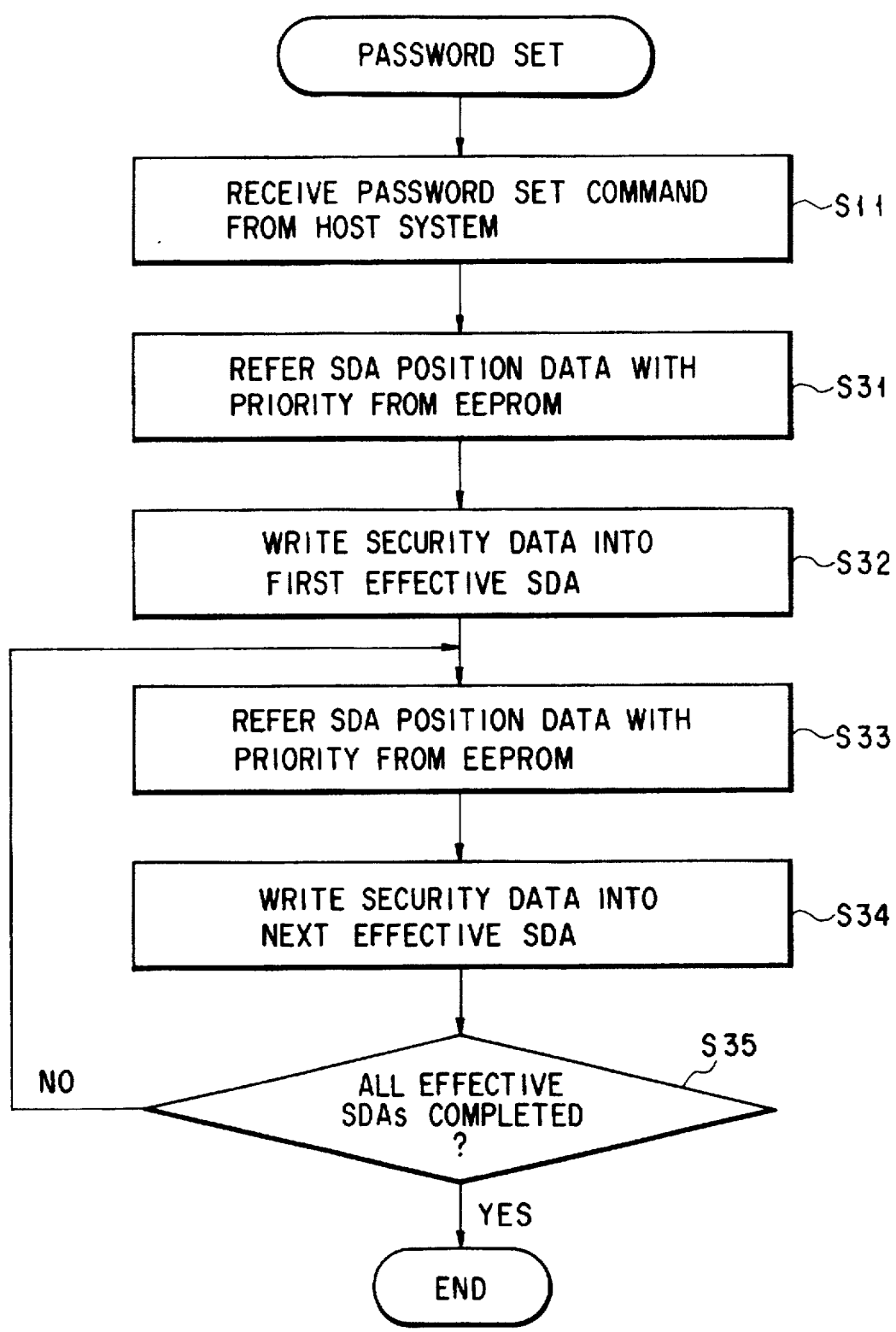
FIG. 8 is a flow chart showing a password setting processing in the second embodiment.
Figure 9:
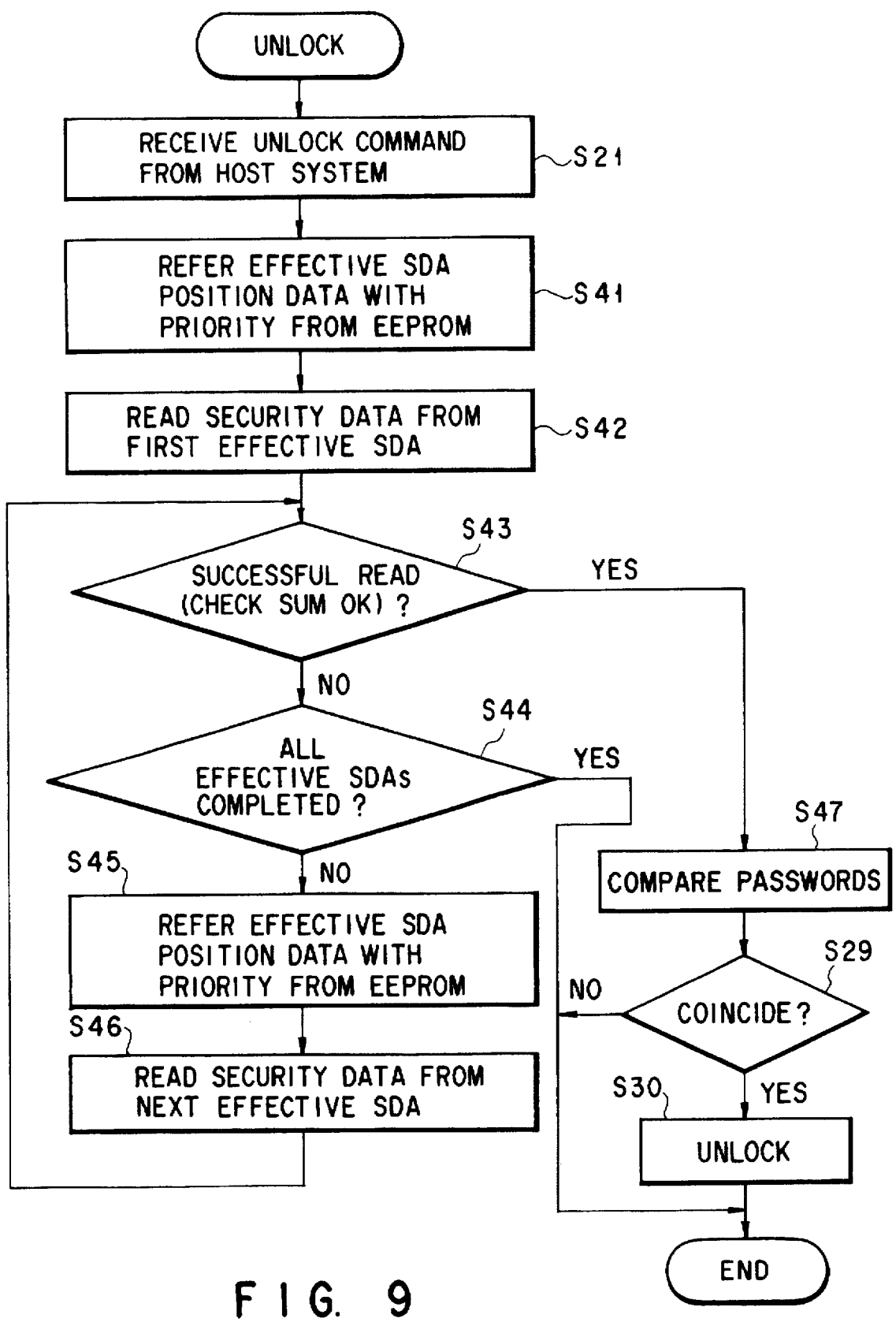
FIG. 9 is a flow chart for explaining an unlock processing in the second embodiment.

In the second embodiment, processings according to the flow charts of FIGS. 7 to 9 are performed instead of the flow charts of FIGS. 4 to 6 so as not to require the counter portion 43 in the security data. In FIGS. 7 to 9, the same processing portions as FIGS. 4 to 6 are designated by the same reference numerals and a detailed explanation thereof is omitted in the following description.

First, in effective SDA selection-registering processing, processing in a step S4a in FIG. 7 is performed instead of the processing in the step S4 in FIG. 4. Here, data of a sequential order (a priority order) of access is added to position data of N effective SDAs and is registered in an EEPROM 13. For example, this priority data is generated on the basis of the rate of a read error in the N effective SDAs. The sequential order becomes high as the rate of a read error is small. Further, when the N effective SDAs are sequentially accessed, it is possible to set a sequential order (a sequential order in which an access speed has a priority) of the effective SDAs capable of getting access (seek) for a shortest time.

Next, in password setting processing, processings in steps S31 to S35 in FIG. 8 are performed instead of the steps S12 to S17 in FIG. 5.

In the step S31, it refers to effective SDA position data and priority data registered in a predetermined area of the EEPROM 13. In the step S32, security data including a password input by a user is written into an effective SDA in a first (most prior) sequential order.

In the step S33, it again refers to the effective SDA position data and the priority data. In the step S34, the security data including the password input by the user is written into an effective SDA in the next priority order.

As shown in the step S35, the steps S33 and S34 are repeatedly executed with respect to N−1 effective SDAs except for the effective SDA in the highest priority order, thereby terminating the lock processing.

Next, in unlocking processing, processings in steps S41 to S47 in FIG. 9 are performed instead of the steps S22 to S28 in FIG. 6.

In the step S41, the CPU 10 refers to the effective SDA position data and the priority data registered in the predetermined area of the EEPROM 13. In the step S42, security data is first read from an effective SDA in a first order (highest priority). In the next step S43, it is checked whether or not the reading operation is successfully performed and a value of the read security data matches with a check sum 45 added to this security data.

When it fails in the reading operation, or no value of the security data matches with the check sum even when the reading operation is successfully performed, it again refers to the above effective SDA position data and the above priority data in the step S45 if no security data from a final effective SDA is read in the step S44. In the step S46, security data from an effective SDA in the next priority order is read. Then, it is returned to the step S43.

In contrast to this, when it is judged in the step S43 that the security data is successfully read and matches with the check sum, a password 44 in this security data is compared with a password input by a user in a step S47. (This input password is a password added to an unlock command transmitted from the host system.) When these passwords coincide with each other in a step S29, a locked state is released in a step S30.

Thus, effective SDAs are read in the same sequential order as a writing order of the security data. Accordingly, the security data can be maintained to cope with cases of power interruption at a writing time of the security data and a failure in the lock processing even when no counter portion (43 in FIG. 3) is formed in the security data as mentioned above. This is based on the assumption that a password first written is more reliable.

In the above explanation, the priority data is added to the effective SDA position data and the security data is read/ written into each of the effective SDAs in a sequential order shown by this priority data. However, the security data may be read/written into the effective SDAs in accordance with an arranging order of the effective SDA position data. In this case, necessity for adding the priority data to the effective SDA position data can be omitted. However, when the priority data is used, the security data can be read for a minimum processing time by coinciding this sequential order with a low order of the read error rate and an order (an order in which an access speed has a priority) accessible to the effective SDAs for a shortest time.

In accordance with the second embodiment, in addition to the effects of the first embodiment, data (priority data) showing an access sequential order with respect to a predetermined number of selected effective security data areas is also registered in a non-volatile memory in addition to position data of these selected effective security data areas. When the security data in the effective security data areas is accessed, this access order is determined on the basis of the priority data and the position data registered in the non-volatile memory. Here, the sequential order shown by the priority data is preferably set to coincide with the order of a low read error rate in the predetermined number of effective security data areas selected by an effective security data selecting means. Otherwise, the sequential order shown by the priority data is preferably set to coincide with an order in which this predetermined number of effective security data areas can be accessed for a shortest time.

Therefore, the security data is read without uselessness since the security data areas are accessed in the order of a low error rate, or in an order in which an access speed has a priority. In particular, the above security data is also written in the sequential order shown by the above priority data. Namely, the security data is written (a password is set) and the security data is read in the same sequential order. Accordingly, maintenance of the security data can be improved as a countermeasure for coping with a case in which power interruption, etc. are caused at a setting time of the password.

[Third embodiment]

In the first and second embodiments, the N effective SDAs are fixed at a time point at which the magnetic disk drive apparatus is forwarded. Accordingly, when data of the effective SDAs are partially broken due to a certain factor after the magnetic disk drive apparatus is shipped, the number of really usable effective SDAs is reduced. In this case, backup can be performed by the remaining effective SDAs. However, a problem is caused when the number of the remaining effective SDAs is greatly reduced (a rate of such a case is almost equal to zero).

Therefore, the third embodiment is constructed such that no effective SDAs are fixed at a shipment time of the disk drive apparatus. Hardware is the same as FIGS. 1 and 2, and an SDA format is obtained by omitting the counter portion 43 from FIG. 3.

In the third embodiment, the effective SDA selection-registering processing as shown in the flow charts of FIGS. 4 and 7 is not performed at a manufacturing time of the magnetic disk drive apparatus as in the first and second embodiments. A manufacturer simply allocates four security data every areas SDA0 to SDA3 (24 security data areas SDAs in total) into a system area 101 on the respective disk surfaces 100-0 and 100-1 of disks 1-0 to 1-2.

When a user locks this disk drive apparatus, a locking operation is performed from the host system. Thus, a command (a password setting command) for setting passwords including a password input by the user is transmitted from the host system to the magnetic disk drive apparatus of FIG. 1. Thus, lock processing (password setting processing) described later is performed in accordance with the flow chart of FIG. 10.

First, in a step S51, the CPU 10 receives the password setting command transmitted from the host system through the host interface 16 and the disk controller 14. Then, in a step S52, the CPU 10 sets a flag showing that a lock processing is performed in a predetermined area of the EEPROM 13.

In a step S53, the CPU 10 writes security data in the format of FIG. 3 (but excluding the counter portion 43) to all the security data areas SDA0 to SDA3 respectively allocated into the system area 101 on the respective disk surfaces 100-0 and 100-1 of the disks 1-0 to 1-2. In this security data, the password input by a user is set to the password portion 44 and the flag portion 42 shows that the password is set.

In a step S54, the CPU 10 reads the security data written into the security data areas SDA0 to SDA3 on the respective disk surfaces 100-0 and 100-1 of the above disks 1-0 to 1-2, and selects SDAs each having a low error rate.

Similar to the above step S2, a method for selecting these SDAs each having a low error rate can be constructed by a method in which the operation of ECC correction is stopped and these SDAs are selected from readable SDAs. Otherwise, this selecting method can be also constructed by a method in which the number of read retry times is set and areas SDAs readable at a number equal to or smaller than a constant retry number are selected.

Here, nine areas in total composed of three areas (SDA1, SDA2, SDA3) from the disk surface 100-0 (head #0) of the disk 1-0, one area (SDA2) from the disk surface 100-1 (head #1) of the disk 1-0, two areas (SDA1, SDA3) from the disk surface 100-0 (head #2) of the disk 1-1, two areas (SDA0, SDA2) from the disk surface 100-0 (head #4) of the disk 1-2, and one area (SDA1) from the disk surface 100-1 (head #5) of the disk 1-2 are set to be selected (detected) as the security data areas SDAs each having a low error rate.

Thus, the CPU 10 selects the security data areas SDAs each having a low error rate from the 24 security data areas SDAs in the step S54. Thereafter, in a step S55, the CPU 10 selects N (here, N=4) predetermined SDAs and dispersed on plural (here, N) disk surfaces as effective SDAs from these selected security data areas. Accordingly, in this embodiment in which the above nine security data areas SDAs are selected in the step S54, for example, one area SDA1 having a lowest error rate is selected from the SDA1, SDA2, and SDA3 selected in the step S54 on the disk surface 100-0 (head #0) of the disk 1-0. One area SDA2 is selected from another disk surface 100-1 (head #1) of this disk 1-1. One area SDA1 having a lowest error rate is selected from SDA1 and SDA3 selected in the step S54 on the disk surface 100-0 (head #2) of the next disk 1-1. No area SDA having a low error rate exists on the disk surface 100-1 (head #3) of this disk 1-1. Therefore, one area SDA0 having a lowest error rate is selected from SDA0 and SDA2 selected in the step S54 on the disk surface 100-0 (head #4) of the next disk 1-2.

In this embodiment, when the number of effective SDAs selected (detected) in the step S55 is less than N (=4), or when the number of effective SDAs is equal to or greater than N, but these effective SDAs are not dispersed on N disk surfaces or more, this magnetic disk drive apparatus is treated as a disk drive apparatus having an error so that no subsequent processing is performed.

The CPU 10 selects the N effective security data areas SDAs in the step S55. Thereafter, in a step S56, position data of these N effective SDAs are registered in a predetermined area of the EEPROM 13.

Thus, if the N effective SDAs dispersed on the respective disk surfaces can be selected and the position data of these N effective SDAs can be correctly registered in the predetermined area of the EEPROM 13, the CPU 10 resets the lock processing flag set in the predetermined area of the EEPROM 13 in a step S57 and terminates the password setting processing.

Accordingly, when the lock processing flag is in a reset state at a terminating time of the password setting processing, it is guaranteed that the password setting processing is normally terminated. When power is interrupted during a writing operation of the security data or the selection of an effective SDA, or when it fails in the password setting processing, it does not proceed to the step S57 so that the processing flag is set as it is.

Thereafter, when a hard reset or a power-on reset of the magnetic disk drive apparatus is performed, this magnetic disk drive apparatus is set to a locked state and a reading/writing operation on this magnetic disk drive apparatus (with respect to the disks 1-0 to 1-2) is inhibited unless the same password as the set password is input from a user and the locked state is released, thereby protecting data recorded to the disks 1-0 to 1-2.

Figure 11:
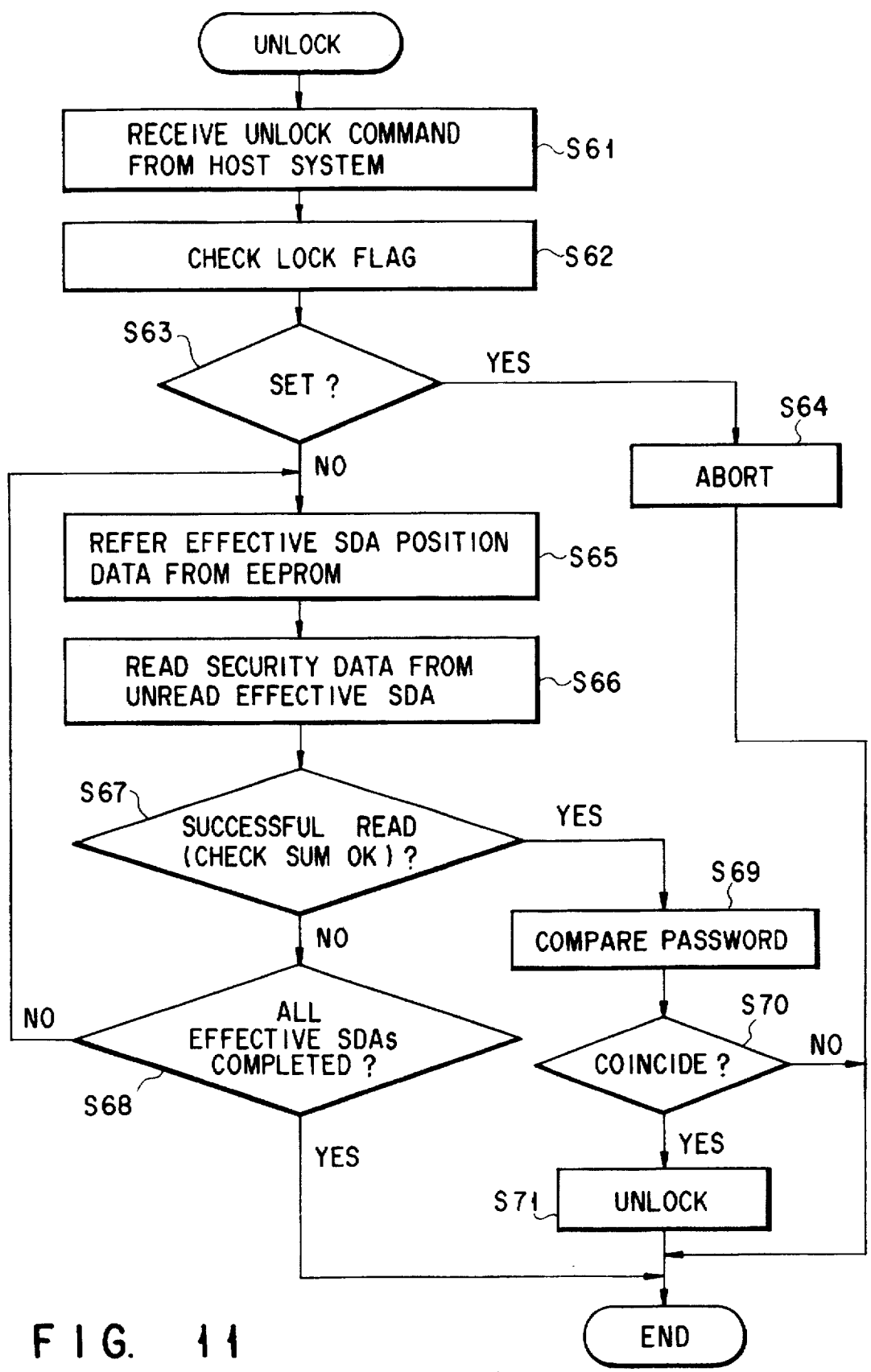
FIG. 11 is a flow chart for explaining an unlock processing in the third embodiment.

Unlock processing will next be described with reference to the flow chart of FIG. 11.

First, when the user utilizes such a locked magnetic disk drive apparatus, the user performs an operation for releasing the locked state of this magnetic disk drive apparatus from the host system. Thus, an unlock command including a password input by the user is transmitted from the host system to the magnetic disk drive apparatus of FIG. 1.

Figure 10:
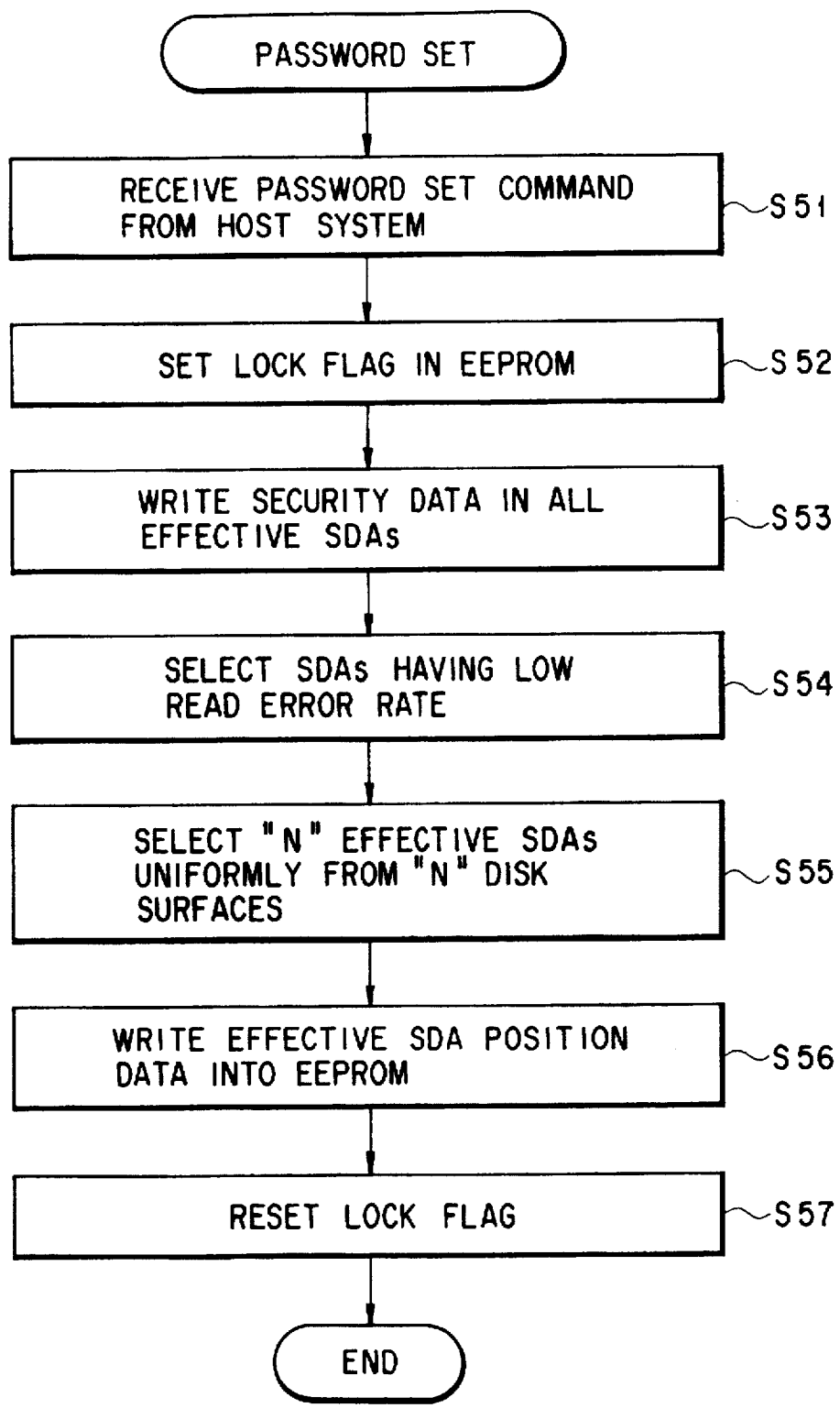
FIG. 10 is a flow chart showing a password setting processing in a third embodiment of the present invention.

In a step S61, the CPU 10 receives the unlock command transmitted from the host system through the host interface 16 and the disk controller 14. In a step S62, the CPU 10 checks a state of the lock processing flag registered in a predetermined area of the EEPROM 13. When this flag is set in a step S63, the CPU 10 determines that the password setting processing according to the flow chart of FIG. 10 is abnormally terminated so that the unlock is aborted in a step S64. In this case, the password setting processing is performed again.

In contrast to this, when the lock processing flag is not set (is reset) in the step S63, the CPU 10 determines that the password setting processing according to the flow chart of FIG. 10 is normally terminated. In this case, the CPU 10 refers to effective SDA position data registered in a predetermined area of the EEPROM 13 in a step S65. In a step S66, the CPU 10 sequentially reads security data from N effective security data areas SDAs in total dispersed on N disk surfaces (here, N=4) among the respective disk surfaces 100-0 and 100-1 (namely, the six disk surfaces in total) of the disks 1-0 to 1-2 (in disk read processing). This disk read processing is performed by performing the operation of ECC correction.

Every time the CPU 10 reads the security data from one effective SDA, the CPU 10 checks in a step S67 whether or not the reading operation is successfully performed and a value of the read security data matches with a check sum 45 added to this security data.

When it fails in the reading operation, or no value of the read security data matches with the check sum even when the reading operation is successfully performed, the CPU 10 again refers to the effective SDA position data within the EEPROM 13 in the step S65 if no security data is read from a final effective SDA in a step S68. In the step S66, the CPU 10 reads the security data from another effective SDA.

In contrast to this, when the reading operation is successfully performed and the value of the read security data matches with the check sum, the CPU 10 compares the password 44 in the read security data with a password input by a user in a step S69. (This input password is a password added to the unlock command transmitted from the host system.) Only when these passwords coincide with each other in a step S70, the CPU 10 releases the locked state in a step S71.

Thus, in the third embodiment, N effective SDAs are selected and registered every lock processing (password setting processing). Therefore, all the N effective SDAs can be utilized when unlock processing is performed after the lock processing is normally terminated. Further, the lock processing flag is set at a starting time of the lock processing and is reset when the lock processing is normally terminated. Therefore, security data in the N effective SDAs is guaranteed if the lock processing flag is in a reset state at an unlocking processing. Accordingly, it is not necessary to provide a counter portion in the security data as in the above first embodiment, and read the security data from the effective SDAs in the same sequential order as a writing order of the security data as in the above second embodiment so as to prevent a bad influence caused by power interruption, etc. at a setting time of the security data.

As mentioned above in detail, in the present invention, even when data in an area (a security data area) for setting the security data on a disk are broken by a certain factor, backup of these data can be performed by another security data area so that a security function can be improved.

Further, in the present invention, the security data can be efficiently accessed by setting only a predetermined number of security data areas having a low read error rate to effective security data areas and using these security data areas to get access to the security data.

Further, in the present invention, maintenance of the security data can be improved by writing the security data (setting a password) and reading the security data in the same sequential order.

The present invention is not limited to the above embodiments, but can be embodied in various kinds of modifications. For example, each of the above embodiments is independently described, but plural embodiments may be suitably combined with each other. In the first and third embodiments, effective SDA position data also preferably has priority data, and an access order to N effective SDAs is preferably set to the order of a low read error rate, or an order capable of getting access (seek) for a shortest time so as to improve access efficiency to the security data.

In the above description, one security data area SDA is constructed by two sectors, but may be constructed by three sectors or more, or may be constructed by one sector. If the security data area SDA is constructed by one sector, it is not necessary to form the check sum 45 in the security data.

In the above explanation, four security data areas SDAs are located on all disk surfaces of three disks, but may be located on at least two disk surfaces. Therefore, the number of disks is not limited to three, but may be set to one. However, backup effects are improved as the number of disk surfaces having the security data areas SDAs uniformly arranged is increased. Further, a recording disk surface is set to double sides, but may be set to a single side. Furthermore, a hard disk drive apparatus having plural disks therein is used as an example in the above explanation. However, a magnetic disk drive apparatus having a removable medium and a hard disk drive apparatus having a removable disk portion may be used.

What is claimed is:

1. A disk drive apparatus having at least one disk capable of accessing to the disk when a set password is input to the disk drive apparatus, comprising:

at least two disk surfaces with plural password data areas arranged thereon among all disk surfaces;

means for writing password data to said plural password data areas, whereby the password data areas have a backup function;

effective password data area selecting means for selecting a predetermined number of password data areas each having a low read error rate as effective password data areas from said plural password data areas such that the predetermined number of password data areas are dispersed on said at least two disk surfaces;

a rewritable non-volatile memory;

registering means for writing position data of the predetermined number of effective password data areas selected by said effective password data area selecting means into said non-volatile memory; and means for reading the password data based on said position data written in said non-volatile memory.

2. A disk drive apparatus having at least one disk capable of accessing to the disk when a set password is input to the disk drive apparatus, comprising:

at least two disk surfaces with plural password data areas arranged thereon among all disk surfaces;

means for writing password data to said plural password data areas, whereby the password data areas have a backup function;

effective password data area selecting means for selecting a predetermined number of password data areas each having a low read error rate as effective password data areas from said plural password data areas such that the predetermined number of password data areas are dispersed on said at least two disk surfaces;

a rewritable non-volatile memory;

registering means for writing position data and an access order data of the predetermined number of effective password data areas selected by said effective password data area selecting means into said nonvolatile memory; and means for reading the password data based on said position data and said access order data written in said non-volatile memory.

3. The disk drive apparatus according to claim 2, wherein said access order data indicates an increasing order of a read error rate in said predetermined number of effective password data areas.

4. The disk drive apparatus according to claim 2, wherein said access order data indicates an increasing order of an accessing time of said predetermined number of effective password data areas.

5. A disk drive apparatus capable of accessing to a disk when a set password is input to the disk drive apparatus, comprising:

at least one disk in which plural password data areas are arranged on an entire disk; and means for writing password data to said plural password data areas, whereby the password data areas have a backup function, wherein the password data set in said password data areas has a counter portion for counting a number of password data setting times; and said password data writing means increments a counting value of the counter portion set in each of the password data areas by a predetermined number at a setting time of the password data to said password data areas, writes the password data having an incremented value in the counter portion to the password data areas, performs password data reading from said password data areas, and manages a version of set password data by comparing an input password with the password data having a largest counting value of the counter portion among the password data which have been read normally.

6. An access control method of a disk drive apparatus for controlling access to a disk by verifying a password written in the disk in advance with a password input by a user, the method comprising the steps of:

writing a same password to plural password data areas dispersed on at least one disk; and reading data from each of said plural password data areas, determining whether or not the data is read normally and comparing one of the data areas which has been read normally, with the input password to control access based on a result of comparison, wherein a value showing a number of password writing times which corresponds to each of the plural password data areas is written into the plural password data areas in said writing step; and a password having a largest value of the number of password writing times among all passwords normally read is compared with the input password.

7. An access control method of a disk drive apparatus for controlling access to a disk by verifying a password written in the disk in advance with a password input by a user, the method comprising the steps of:

writing a same password to plural password data areas dispersed on at least one disk; and reading data from each of said plural password data areas, determining whether or not the data is read normally and comparing one of the data areas which has been read normally, with the input password to control access based on a result of comparison, wherein the password is written into each of the plural password data areas in a predetermined sequential order in said writing step; and the password is read from each of the password data areas in the writing sequential order and a password first normally read is compared with the input password.

8. The access control method according to claim 7, wherein said predetermined sequential order increases as a read error rate in the password data area increases.

9. The access control method according to claim 7, wherein said predetermined sequential order increases as an accessing time of the password data area increases.

10. An access control method of a disk drive apparatus for controlling access to a disk by verifying a password written in the disk in advance with a password input by a user, the method comprising the steps of:

writing a same password to plural password data areas dispersed on at least one disk; and reading data from each of said plural password data areas, determining whether or not the data is read normally and comparing one of the data areas which has been read normally, with the input password to control access based on a result of comparison, wherein a read error rate of said plural password data areas is measured, a predetermined number of password data areas having a low error rate are selected and the password is written into said selected password data areas in said writing step and, wherein a read error rate of said plural password data areas is measured and a predetermined number of password data areas having a low error rate are uniformly selected from each of the disk surfaces in said writing step.

* * * * *

UNITED STATES PATENT AND TRADEMARK OFFICE
CERTIFICATE OF CORRECTION

PATENT NO. : 5,799,145
DATED     : August 25, 1998
INVENTOR(S) : Imai et al.

It is certified that error appears in the above-identified patent and that said Letters Patent is hereby corrected as shown below:

On the title page, item [30], under Foreign Application Priority Data, please amend the Foreign Application Priority Data to read:

Dec. 25, 1995  [JP]  Japan ............7-336975

Signed and Sealed this

Sixteenth Day of February, 1999

Attest:

*Acting Commissioner of Patents and Trademarks*

Attesting Officer